C. A. SHOGREN.
METAL FRAME SCREEN.
APPLICATION FILED NOV. 27, 1918.

1,344,093. Patented June 22, 1920.

Witness:
R. Burkhardt

Inventor:
Charles A. Shogren,
By Sheridan, Jones, Sheridan & Smith
Attys.

UNITED STATES PATENT OFFICE.

CHARLES A. SHOGREN, OF CHICAGO, ILLINOIS.

METAL-FRAME SCREEN.

1,344,093. Specification of Letters Patent. Patented June 22, 1920.

Application filed November 27, 1918. Serial No. 264,296.

*To all whom it may concern:*

Be it known that I, CHARLES A. SHOGREN, a citizen of the United States, residing at Chicago, in the county of Cook and State of Illinois, have invented certain new and useful Improvements in Metal-Frame Screens, of which the following is a specification.

My invention relates to improvements in metal frame screens.

Screens of this character, which are now on the market, are so designed that it is very difficult, if not impossible, to renew the wire cloth or screen proper when the latter deteriorates. Proposals have been made heretofore, as shown in the prior art, to overcome this difficulty by attempting to provide means permitting ready renewal of the screen. Such proposals, however, usually involve clamping the screen between two members in such manner as to give the margin of the screen a very decided short or sharp bend by forcing it into a groove or bending it around a retaining member or by providing a bead on the edge thereof. Other proposals involve the use of tacks to tack the screen to the main frame, the tacks being thereafter covered by a supplemental frame which conceals them and aids in holding the screen in place by friction. None of these latter devices appear to have attained any commercial recognition due doubtless to the fact that the structure in most cases is rather elaborate and, therefore, expensive.

The object of the present invention in general is to overcome these prior difficulties by providing a simple structure by means of which the screen may be readily renewed.

Contributory objects are to provide an arrangement whereby the screen margins remain practically flat, said margins being held by a plurality of sharp points, struck up from one member, which pass through the screen and penetrate the other of two clamping members, and to provide a structure which is rigid and which may be economically manufactured.

In the accompanying drawings I have illustrated one form of the invention which will serve to illustrate the novel features. Other forms, however, are contemplated.

In the drawings—

Figure 1:
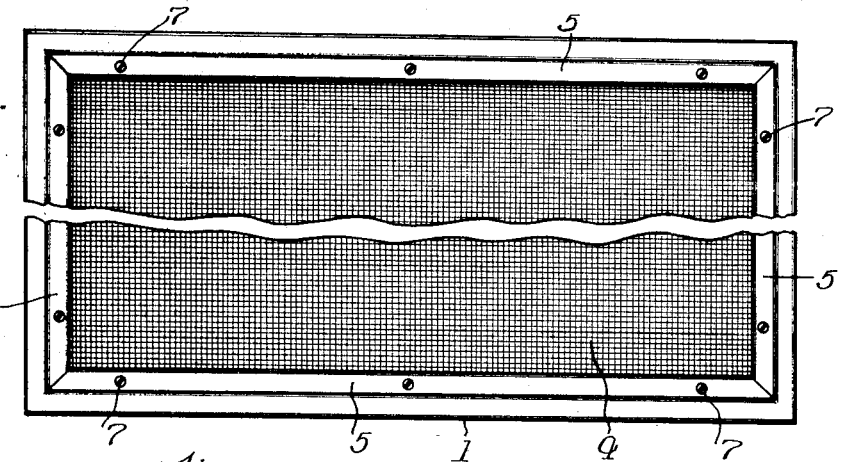
Figure 1 is a partial elevation of a complete metal frame screen.
Figure 2:
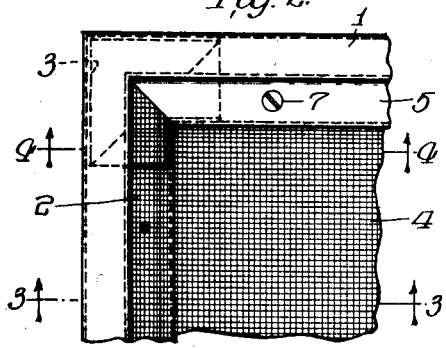
Fig. 2 is an enlarged elevation of one corner thereof with a retaining strip or clamping member removed.
Figure 5:
Fig. 5 is a sectional elevation of a metal retaining strip.
Figure 6:
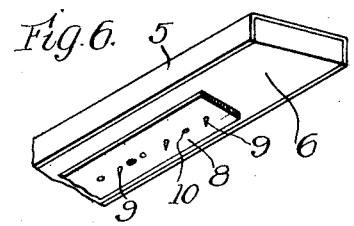
Fig. 6 is a perspective view of the retaining member which carries said strip.
Figure 7:
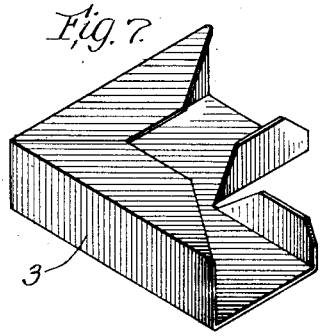
Fig. 7 is an enlarged perspective view of a corner reinforcing member.

The main portion of the screen frame consists of a sheet metal strip 1 bent to form a channel member, the edges being turned in, as shown, to embrace and hold a filler member 2 made preferably of wood, which may be readily slipped into its outer metallic casing after the latter is formed. Said wooden filler members are not as long as their metal containers, but stop short of the beveled ends, as shown in Fig. 2. Said ends are soldered or welded together and are reinforced by a metal filler member 3, this member being struck up from sheet metal and formed as shown in Fig. 7.

Figure 3:
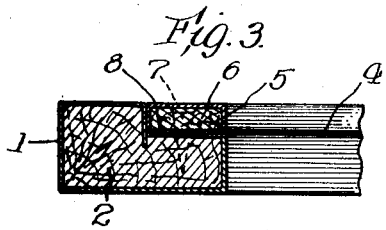
Fig. 3 is a section on the line 3—3 of Fig. 2.
Figure 4:
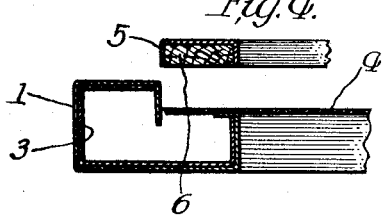
Fig. 4 is a section on the line 4—4 of Fig. 2.

The cross section of the main frame, as shown in Figs. 3 and 4, is generally rectangular with a corner portion cut out forming a rabbet. The wire screen 4 rests on the shoulder, thus formed, and is clamped between the same and a retaining member or strip consisting preferably of a sheet metal channel 5 having a wooden filler 6. The screen is clamped between said shoulder and the retaining strip, the latter being held in place preferably by screws 7. Friction is not relied on, however, as the chief means of holding the screen in place, said screen being positively held by means of a metal strip 8 having sharp projections 9 struck downwardly therefrom, which projections pass through the meshes of the screen and are pressed into the wooden filler 2. The metal strip 8, in the form of device shown in the drawings, is formed as a strip secured to the upper of the two clamping members, although I do not limit myself to this arrangement. It is held in place by a plurality of additional sharp points or struck up portions 10 which are pressed into the wooden filler member 6. It will be understood that said strip 8 may be integral with the reinforcing metal for the wooden filler either of the main frame or of the removable member in which case said additional points or other attaching means may be dispensed with. The metal strips 8 are preferably co-extensive in length with the wooden filler members 2 and the screen is, therefore, positively clamped in place around practically its entire margin. It is also further held in place by the screws 7 which pass, not only through the wooden filler 6, but also through the meshes of the screen thereby further assisting in holding the screen in place, although said screws are not relied on primarily.

It will be noted that the screen margins are practically flat, that is, they are in substantially the same plane as the main area of the screen and are not held in place by providing sharp bends therein, but by the pointed members which penetrate the margins at frequent intervals. A slight bend may be given to the margins, as shown in Fig. 3, but such bend is incidental, arising out of the manufacture of the device, and is not relied on to any substantial extent in holding the screen in place.

The screen frame, thus formed, is reasonably light and is very rigid, the corner construction being such as to overcome the undesirable flexibility and bending of many metal screens now on the market. The screen is also ornamental, its exterior being practically all metal, which may be finished in any one of a number of ornamental finishes and the screen may be readily installed and renewed by simply removing the screws and the strips or clamping members held thereby.

What I claim is:—

1. A metal screen frame comprising a pair of relatively movable metal clamping members, a filler carried by one of said members, a wire screen between said members, and a plurality of projections on one of said members pressing through said screen into the filler carried by the other of said members, the margins of said screen between said clamping members being in the same plane as the exposed portion of said screen.

2. A metal screen frame comprising a main frame of metal having a wooden filler, and a removable member provided with sharp projecting points arranged to pass through the screen and press into said wooden filler member without bending the screen.

3. A screen comprising a frame, a removable clamping member, wire cloth arranged between said parts, said clamping member having a metal strip on one side thereof provided with sharp projecting portions arranged to pass through said screen, the clamped margins of said screen remaining flat.

4. A screen frame comprising a metal casing, a wooden filler therefor, a removable clamping member comprising a metal casing and a wooden filler therefor, and projecting points struck up from the metal of one of said members and arranged to pass through said screen into the wooden filler of the other of said members.

5. A screen frame comprising a metal container, a wooden filler therefor, a removable member comprising a metal channel and a wooden filler therefor, and a strip of metal secured to said last-mentioned wooden filler and having sharp points struck therefrom to engage the screen.

6. In a device of the class described, a main frame, removable parts therefor comprising wooden members, metal strips secured to said members by sharp points struck from the metal, said metal strips having additional sharp points projecting in the opposite direction to engage the screen, and means for detachably securing said removable parts to said main frame.

7. A metal screen comprising metal members bent to rectangular cross section and having a rabbet, said members each having a wooden filler of less length than said metal members thereby forming corner spaces, metal filler members for said corner spaces and removable strips of rectangular cross section arranged to fill said rabbeted portion, and a screen clamped between said members.

8. A metal screen comprising a frame bent around a filler member leaving a shoulder exposed, a screen supported on said shoulder, and a removable member resting on said shoulder flush with the surface of said frame, said removable member clamping said screen against said shoulder and being secured to said exposed filler.

In testimony whereof, I have subscribed my name.

CHARLES A. SHOGREN.